US012785473B2

(12) United States Patent
Sasaki et al.

(10) Patent No.: US 12,785,473 B2
(45) Date of Patent: Nov. 3, 2026

(54) ROTATING ELECTRICAL MACHINE

(71) Applicant: Mitsubishi Electric Corporation, Tokyo (JP)

(72) Inventors: Hidenori Sasaki, Tokyo (JP); Kenta Motoyoshi, Tokyo (JP); Yu Hirotani, Tokyo (JP); Hiroko Ikeda, Tokyo (JP); Shohei Fujikura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 222 days.

(21) Appl. No.: 18/277,317

(22) PCT Filed: Feb. 26, 2021

(86) PCT No.: PCT/JP2021/007322
§ 371 (c)(1),
(2) Date: Aug. 15, 2023

(87) PCT Pub. No.: WO2022/180777
PCT Pub. Date: Sep. 1, 2022

(65) Prior Publication Data

US 2024/0136874 A1 Apr. 25, 2024
US 2024/0235294 A9 Jul. 11, 2024

(51) Int. Cl.
*H02K 1/278* (2022.01)

(52) U.S. Cl.
CPC ......... *H02K 1/278* (2013.01); *H02K 2213/03* (2013.01)

(58) Field of Classification Search
CPC .... H02K 1/278; H02K 1/2781; H02K 1/2746; H02K 1/2753; H02K 1/274; H02K 2213/03
See application file for complete search history.

(56) References Cited

U.S. PATENT DOCUMENTS

2007/0278885 A1* 12/2007 Miyashita .............. H02K 16/02
310/156.43
2013/0106229 A1 5/2013 Goto et al.
(Continued)

FOREIGN PATENT DOCUMENTS

JP 2011199918 A * 10/2011
JP 2012-110181 A 6/2012
(Continued)

OTHER PUBLICATIONS

JP2011199918A translation (Year: 2011).*
(Continued)

*Primary Examiner* — Oluseye Iwarere
*Assistant Examiner* — Nicholas Lee Setzer
(74) *Attorney, Agent, or Firm* — Sughrue Mion, PLLC

(57) ABSTRACT

A rotating electrical machine includes a stator and a rotor, the rotor includes a rotor core and a plurality of magnetic poles, the plurality of magnetic poles includes a plurality of magnet poles formed by permanent magnets, and a plurality of dummy poles, the magnet poles and the dummy poles are alternately disposed in both an axial direction and a circumferential direction, non-magnetic holes are provided between the magnet poles and the dummy poles that are adjacent in the axial direction, and when a length of each magnet pole in the axial direction is tm, a length of each dummy pole in the axial direction is tc, a length of each non-magnetic hole in the axial direction is ta, and a length of the rotor core in the axial direction is lc, the rotating electrical machine satisfies tm>tc and lc<(2×tm)+ta.

17 Claims, 10 Drawing Sheets

(56) References Cited

U.S. PATENT DOCUMENTS

| | | | | |
|---|---|---|---|---|
| 2013/0300242 | A1* | 11/2013 | Yamada | H02K 21/044 310/156.08 |
| 2015/0357892 | A1* | 12/2015 | Nakano | H02K 3/12 180/443 |
| 2016/0294235 | A1* | 10/2016 | Takizawa | B62D 5/0424 |
| 2016/0322873 | A1* | 11/2016 | Udo | H02K 1/28 |
| 2020/0185987 | A1* | 6/2020 | Okazaki | H02K 1/16 |

FOREIGN PATENT DOCUMENTS

| | | | |
|---|---|---|---|
| JP | 2012-244783 | A | 12/2012 |
| JP | 2013-153637 | A | 8/2013 |
| JP | 2014-075965 | A | 4/2014 |
| JP | 2019-092313 | A | 6/2019 |

OTHER PUBLICATIONS

International Search Report for PCT/JP2021/007322, dated Apr. 27, 2021.

Communication dated Oct. 3, 2023 issued by the Japanese Patent Office in application No. 2023-501946.

Extended European Search Report issued Mar. 27, 2024 in Application No. 21927879.3.

Chinese Office Action dated Apr. 11, 2026, issued in Chinese application No. 202180093619.X.

* cited by examiner

ROTATING ELECTRICAL MACHINE

CROSS REFERENCE TO RELATED APPLICATIONS

This application is a National Stage of International Application No. PCT/JP2021/007322 filed Feb. 26, 2021.

TECHNICAL FIELD

The present disclosure relates to a rotating electrical machine.

BACKGROUND ART

Patent Document 1 describes a rotating electrical machine (surface magnet-type motor). On a surface of a rotor of such a rotating electrical machine, a plurality of magnet poles formed of permanent magnets, and a plurality of dummy poles formed of magnetic flux emitted by the magnet poles are provided. The magnet poles and the dummy poles are alternately disposed in each of a circumferential direction and an axial direction. A gap that acts as a magnetic resistance portion is provided between the magnet pole and the dummy pole adjacent in the axial direction.

CITATION LIST

Patent Document

[Patent Document 1]

Japanese Unexamined Patent Application, First Publication No. 2013-153637

SUMMARY OF INVENTION

Technical Problem

In the configuration presented in Patent Document 1, when the length of the magnet pole in the axial direction is increased in order to insure torque output, a problem of the axial length of the rotor increasing accordingly is caused.

The present disclosure has been made in order to solve the above problem, and an objective thereof is to provide a rotating electrical machine that can decrease the axial length of the rotor while insuring torque output.

Solution to Problem

A rotating electrical machine according to the present disclosure includes: a stator; and a rotor disposed inside the stator in a rotatable state with respect to the stator; wherein the stator includes a core back formed in an annular shape, a plurality of teeth radially projecting from the core back towards the rotor, and a plurality of windings wounded around the plurality of teeth, the rotor includes a rotor core, a shaft disposed inside the rotor core and extending in an axial direction, and a plurality of magnetic poles disposed on a surface of the rotor core, the plurality of magnetic poles includes a plurality of magnet poles formed by permanent magnets, and a plurality of dummy poles formed by magnetic flux emitted from the magnet poles interlinking with parts of the rotor core, the magnet poles and the dummy poles are alternately disposed in both the axial direction and a circumferential direction, non-magnetic holes are provided between the magnet poles and the dummy poles that are adjacent in the axial direction, and when a length of each magnet pole of the magnet poles in the axial direction is tm, a length of each dummy pole of the dummy poles in the axial direction is tc, a length of each non-magnetic hole of the non-magnetic holes in the axial direction is ta, and a length of the rotor core in the axial direction is lc, the rotating electrical machine satisfies $tm>tc$ and $lc<(2\times tm)+ta$.

Advantageous Effects of Invention

According to the present disclosure, it is possible to provide a rotating electrical machine that can decrease the axial length of the rotor while insuring torque output.

DESCRIPTION OF EMBODIMENTS

First Embodiment

Figure 1A:
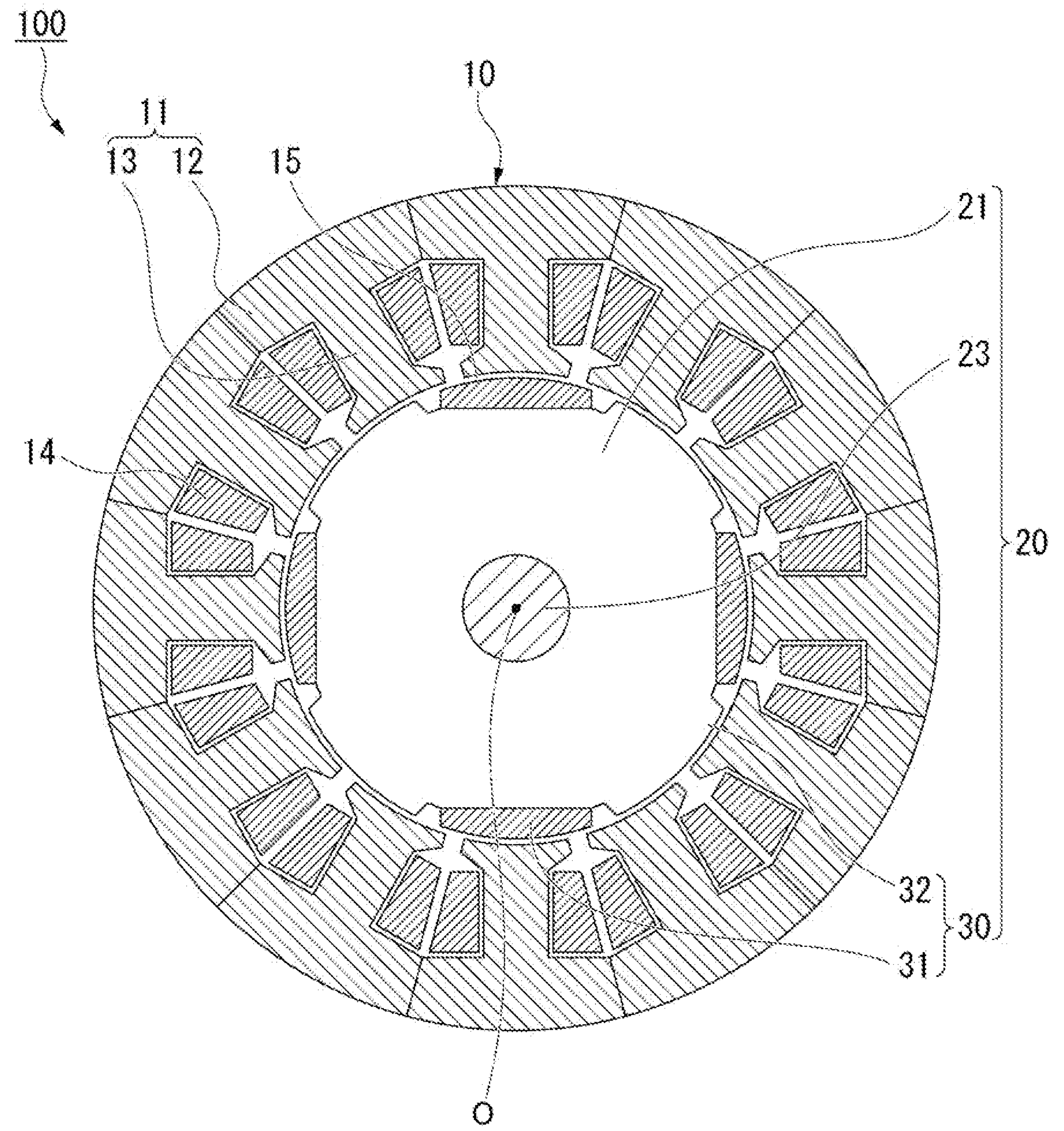
FIG. 1A is a cross-sectional view of a rotating electrical machine according to a first embodiment.

FIG. 1A is a cross-sectional view perpendicularly cut with respect to an axial direction of a rotating electrical machine 100 in the first embodiment. The rotating electrical machine 100 includes a stator 10, and a rotor 20 provided inside the stator 10. The rotor 20 is able to freely rotate with respect to the stator 10.

In the present description a direction along an axis O of the rotor 20 is referred to as an "axial direction". A cross-section perpendicular with respect to the axial direction is referred to as a "cross-section". In the cross-section, a direction that intersects with the axis O is referred to as a "radial direction", and a direction that encloses the axis O is referred to as a "circumferential direction".

The stator 10 is provided so as to enclose an outer circumference of the rotor 20. A gap 15 is formed between an inner circumference of the stator 10 and the outer circumference of the rotor 20. The gap 15 is formed over the entire circumference in the circumferential direction. The stator 10 includes a plurality of stator cores 11, and a plurality of windings 14. Each stator core 11 includes a core back 12 and teeth 13. The core back 12 is formed in an arc like shape along the circumferential direction. The teeth 13 protrude from a center portion in the circumferential direction of each of the core backs 12 towards an inside in the radial direction. Each of the windings 14 are wrapped around the plurality of teeth 13 in a concentrated winding method.

Figure 1B:
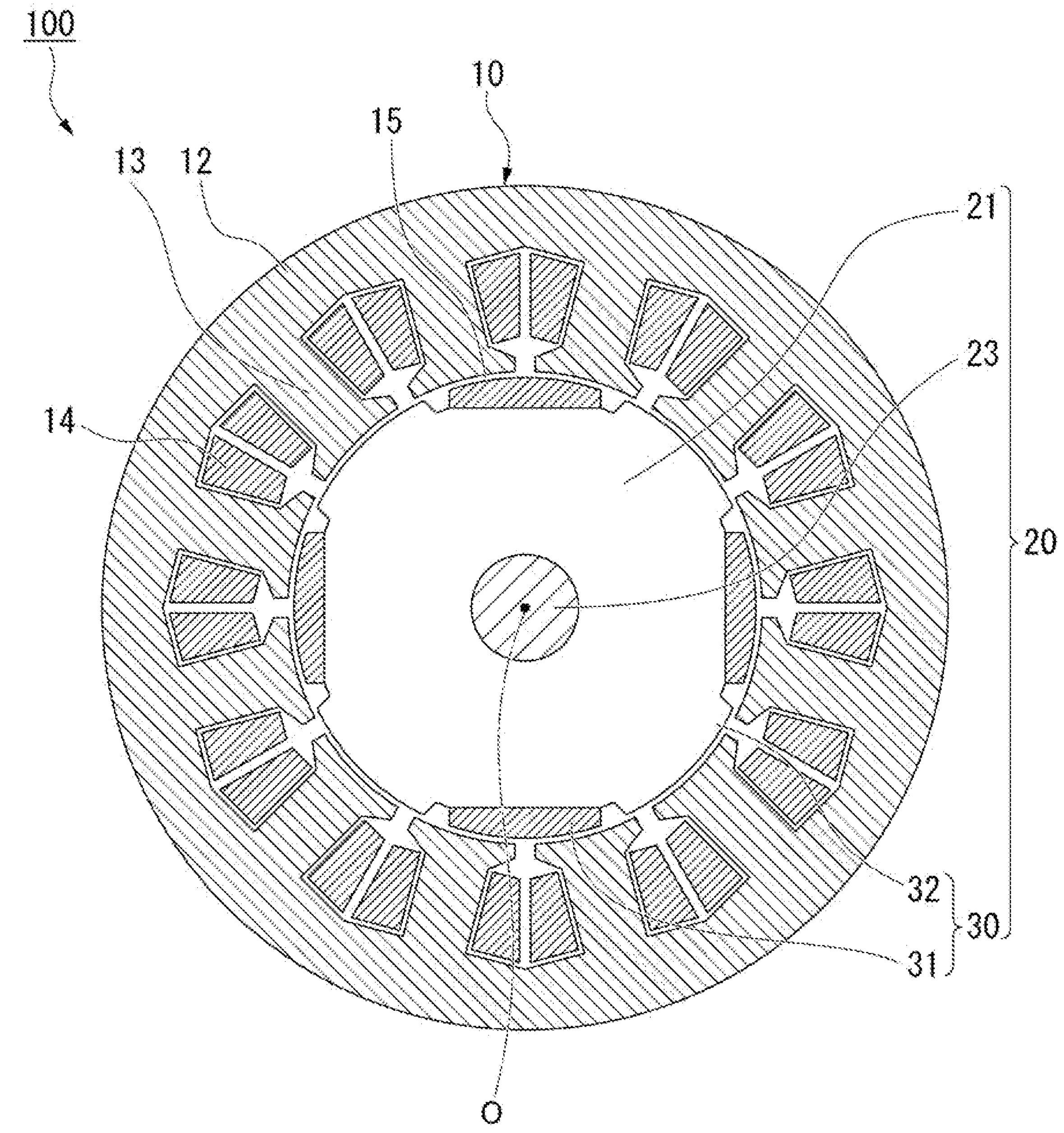
FIG. 1B is a cross-sectional view of the rotating electrical machine according to a modified example of the first embodiment.

In FIG. 1A the plurality of stator cores 11 are arranged in the circumferential direction and are formed of the plurality of core backs 12 forming an arc like shape. However, as shown in FIG. 1B, it is possible to adopt a configuration in which a plurality of teeth 13 protrude from one core back 12 having an arc like shape. In other words, it is possible to adopt a configuration in the stator cores 11 in FIG. 1A each are one unified structure. As shown in the configurations of FIG. 1A and FIG. 1B, a number of the teeth 13 is 12 and a number of the windings 14 are also 12. However, it is possible to have the number of the windings 14 be less than the number of the teeth 13. In other words, when the number of the teeth 13 is nt and the number of the windings 14 is nc, so long as the relationship $nc \leq nt$ is satisfied, the number of the teeth 13 and the windings 14 may appropriately be changed.

The rotor 20, includes a rotor core 21, a shaft 23, and a plurality of magnetic poles 30. The rotor core 21 is a cylindrical shape extending in an axial direction. The rotor core 21 is formed of material having magnetic qualities (e.g, alloys including iron, steel, or the like). The shaft 23 is disposed on the inside of the rotor core 21 and is fixed to the rotor core 21. The plurality of magnetic poles 30 are formed on the surface of the rotor core 21 at intervals in the circumferential direction. In the present embodiment, a plurality of magnet poles 31 and a plurality of dummy poles 32 are included in the plurality of magnetic poles 30. The magnet poles 31 are formed by permanent magnets attached to the rotor core 21. The dummy poles 32 are formed by magnetic flux emitted from the magnet poles 31 interlinking with parts of the rotor core 21. The rotor 20 is a surface magnet type rotor having a plurality of permanent magnets (the magnet poles 31) disposed on the surface of the rotor core 21.

The magnet poles 31 and the dummy poles 32 are both alternately disposed in the circumferential direction. In the example of FIG. 1A, the number of magnetic poles 30 (hereon referred to as number of magnetic poles p) included in the rotor 20 is eight. In such eight magnetic poles 30, four (in other words, p/2) magnet poles 31 and four (in other words, p/2) dummy poles 32 are included. As long as the number of magnetic poles p is an even number greater than or equal to two, the number may appropriately be changed. In the rotor 20 in FIG. 1A and FIG. 1B, the magnet poles 31 and the dummy poles 32 have the same shape. However, the shapes of the magnet poles 31 and the dummy poles 32 may differ. The number of the magnet poles 31 the number of the dummy poles 32 may also differ.

Each of the magnet poles 31 is configured so that a south pole "S" or a north pole "N" shows on an outer circumferential surface (surfaces on the side facing the stator 10) thereof. A pair of the magnet poles 31 in the same position in the axial direction have the same poles shown on the outer circumferential surface thereof. In other words, in a single cross-section, a similar pole (S pole or N pole) is shown on each of the outer circumferential surfaces of the plurality of magnet poles 31 respectively. The poles shown on the outer circumferential surfaces of the magnet poles 31 and the dummy poles 32 that are in the same position in the axial direction are reversed. For example, in a single cross-section, when the outer circumferential surfaces of the magnet poles 31 are all N poles, the outer circumferential surfaces of the dummy poles 32 are all S poles. In a single cross-section, when the outer circumferential surfaces of the magnet poles 31 are all S poles, the outer circumferential surfaces of the dummy poles 32 are all N poles.

A magnetic force is created between the magnetic poles 30 and the teeth 13 when a magnetic field is generated by a predetermined current flowing to the windings 14. Due to such magnetic force, it is possible to have the stator 10 and the rotor 20 rotate around the axis O in a relative manner.

Figure 2A:
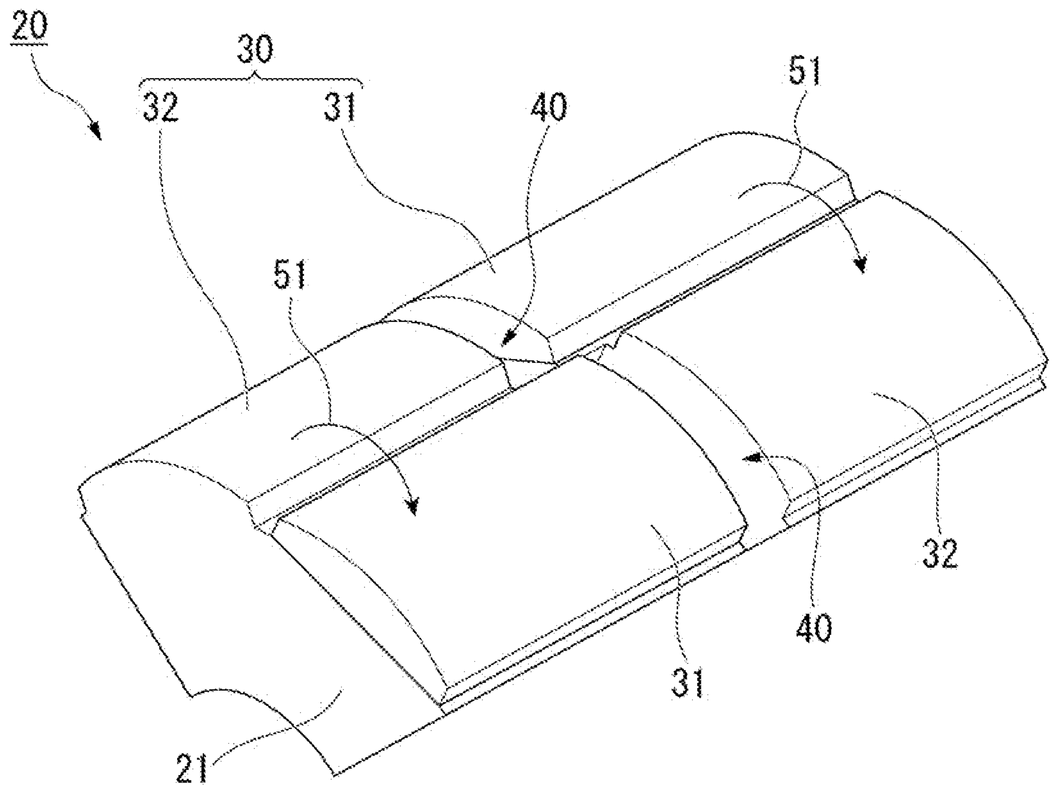
FIG. 2A is a perspective view showing a quarter model of the rotor according to the first embodiment.

FIG. 2A is a perspective view of a quarter model of the rotor 20. A quarter model is a model view showing a single quarter out of the quarters of the rotor 20 taken in the circumferential direction. As shown in FIG. 2A, the magnet poles 31 and the dummy poles 32 are both alternately disposed in both the axial direction and the circumferential direction. The pair of magnetic poles 30 that are adjacent in the axial direction or in the circumferential direction are disposed so as to have differing polarities from one another.

Figure 2B:
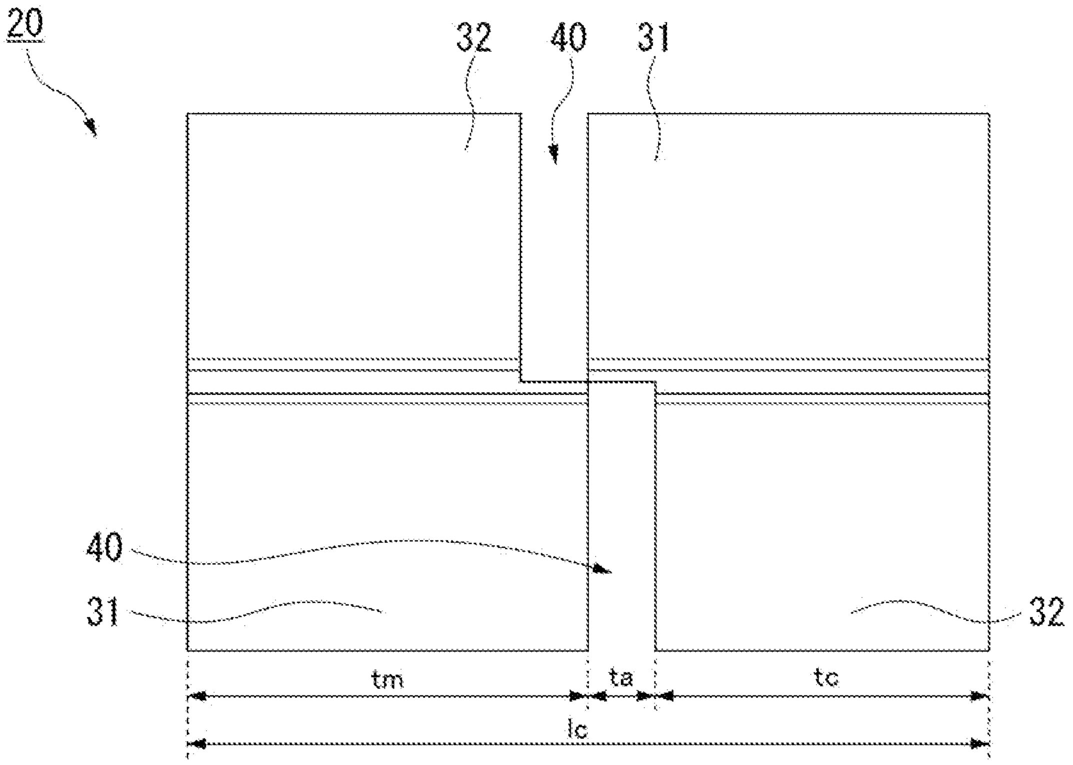
FIG. 2B is a view showing a side view of the quarter model shown in FIG. 2A.

FIG. 2B is a view (side view) of the quarter model of the rotor 20 as seen from a direction orthogonal to the axial direction. As shown in FIG. 2B, non-magnetic holes 40 are provided between the magnet poles 31 and the dummy poles 32 that are adjacent in the axial direction. The non-magnetic holes 40 are parts that do not have any magnetic bodies disposed therein. In the present description, a "magnetic body" is any material that has polarity to a degree that affects the motion of the rotating electrical machine 100. For example, in the non-magnetic holes 40, air may be present, or a non-magnetic body (any material that has a polarity to a degree that may be ignored) may be present. Magnetic flux emitted from the magnet poles 31 interlinks the magnet poles 31 to the opposing dummy poles 32 (in the circumferential direction), sandwiching the non-magnetic holes 40 therebetween.

As shown in FIG. 2B, in the present embodiment, dimensions of the magnet poles 31 and the dummy poles 32 in the axial direction are different. Specifically, an axial direction length of each magnet pole 31 of the magnet poles 31 is longer compared to an axial direction length of each dummy pole 32 of the dummy poles 32. When an axial direction length of the rotor core 21 is lc, the axial direction length of each magnet pole 31 of the magnet poles 31 is tm, the axial direction length of each dummy pole 32 of the dummy poles 32 is tc, and the axial direction length of each non-magnetic hole 40 of the non-magnetic holes 40 is ta, the below equations (1) and (2) are satisfied:

$$lc=tm+ta+tc \quad (1)$$

$$tm>tc \quad (2)$$

From equations (1) and (2), the relationship $lc<(2\times tm)+ta$ is satisfied. With such a configuration, it is possible to insure an average torque by making a volume of the magnet pole 31 larger, while making the axial length lc of the rotor core 21 smaller.

Figure 2C:
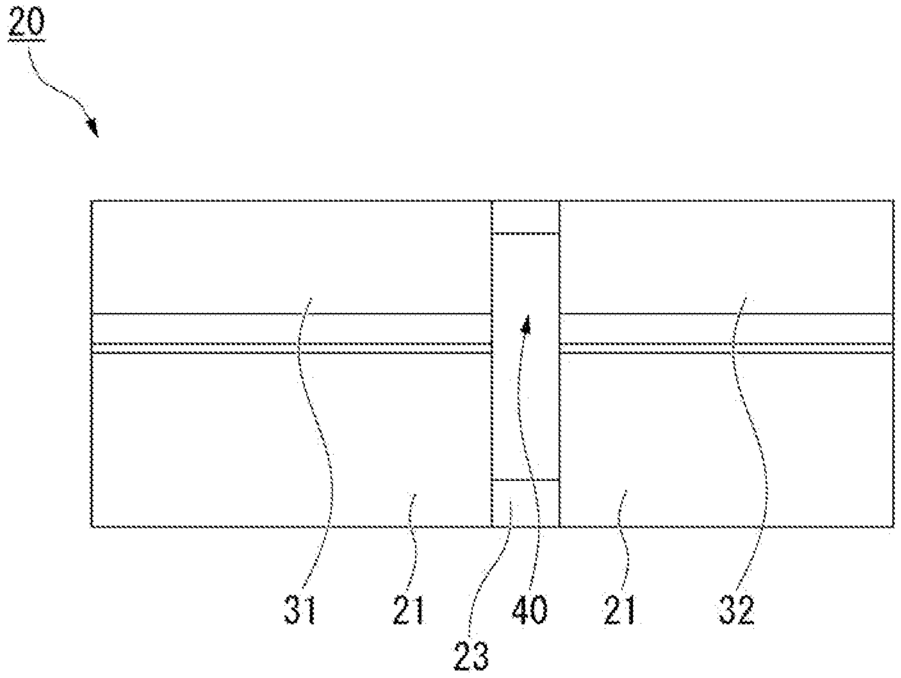
FIG. 2C is a view in which the point of view of the quarter model shown in FIG. 2B is changed by 90 degrees.

FIG. 2C is a view in which the point of view of the quarter model of the rotor 20 shown in FIG. 2B is moved by 90 degrees in the circumferential direction. As shown in FIG. 2C, the rotor core 21 is disposed over the entire region on a radially inner side of a magnet pole 31 of the magnet poles 31 and a dummy pole 32 of the dummy poles 32. Due to the presence of a non-magnetic hole 40 of the non-magnetic holes 40, the rotor core 21 located on the radially inner side of a magnet pole 31 of the magnet poles 31 and the rotor core 21 located on the radially inner side of a dummy pole 32 of the dummy poles 32 are separated in the axial direction. The shaft 23 is responsible for connecting a pair of the separated rotor cores 21 in the axial direction.

Figure 3:
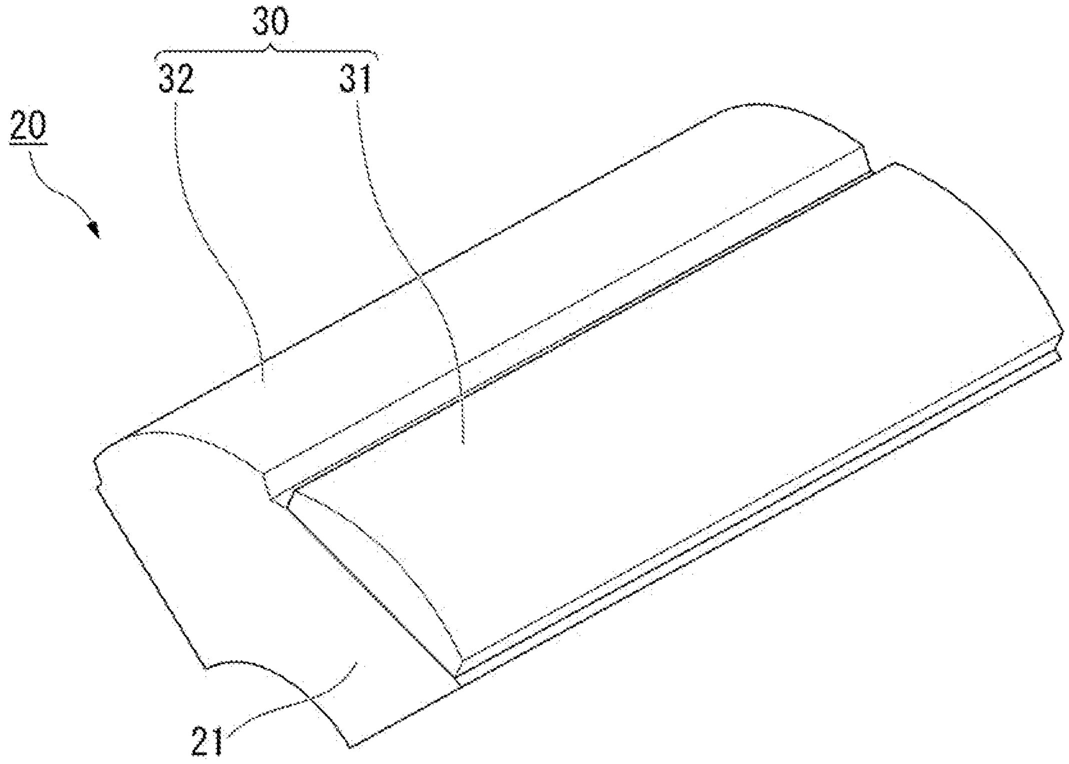
FIG. 3 is a perspective view showing the quarter model of the rotor according to a first comparative example.
Figure 4:
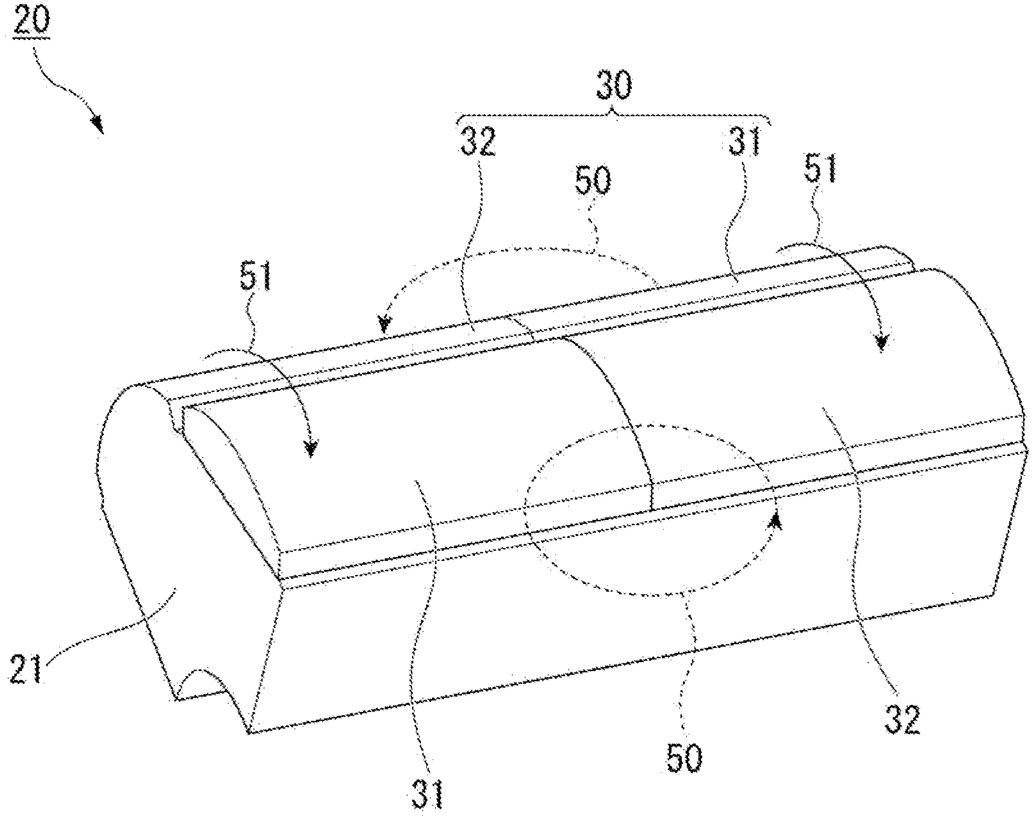
FIG. 4 is a perspective view showing the quarter model of the rotor according to a second comparative example.
Figure 5:
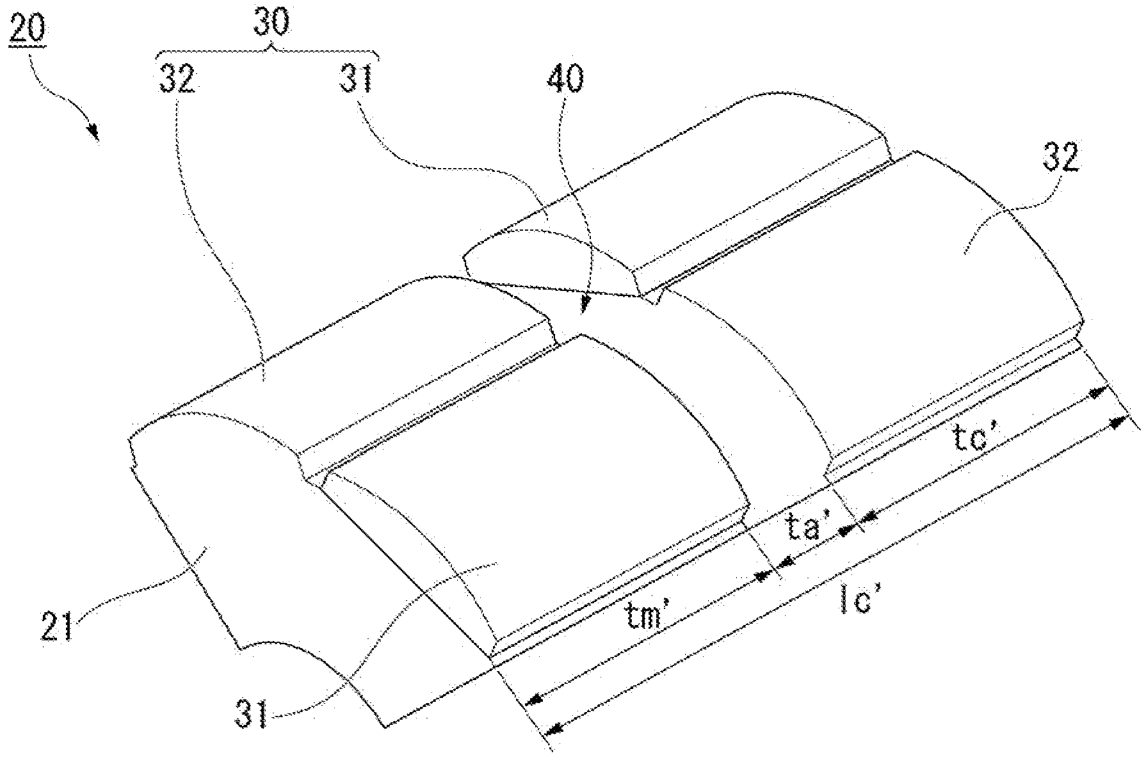
FIG. 5 is a perspective view showing the quarter model of the rotor according to a third comparative example.

Next, the effects of the rotating electrical machine 100 according to the present embodiment are explained in comparison with the comparative examples shown in FIG. 3 to FIG. 5.

FIG. 3 is a perspective view of a quarter model of a rotor according to a first comparative example. FIG. 4 is a perspective view of a quarter model of a rotor according to a second comparative example. FIG. 5 is a perspective view of a quarter model of a rotor according to a third comparative example.

As shown in FIG. 3, in the first comparative example, the magnet poles 31 and the dummy poles 32 extend over an entire length of the rotor 20 in the axial direction. In the configuration of the rotor 20 in FIG. 3, a power of an effective magnetic flux at the magnet poles 31 and at the dummy poles 32 that contributes to the torque differs. For this reason, magnetic flux distribution in the gap 15 is asymmetrical. Thus, a higher order component is generated resulting in larger torque pulsations.

As shown in FIG. 4, the magnet poles 31 and the dummy poles 32 in the second comparative example, are arranged and disposed in the in the axial direction. Torque pulsations are generated in a configuration of the second comparative example as with the first comparative example (FIG. 3). However, by having the magnet poles 31 and the dummy poles 32 be alternately disposed not only in the circumferential direction, but in the axial direction as well, the torque pulsations caused by the asymmetric magnetic flux distribution as seen from the entirety of the rotor 20 cancel each other out. However, in the second comparative example, the magnet poles 31 and the dummy poles 32 are disposed closely to one another in the axial direction. For this reason, the magnetic resistance between the magnet poles 31 and the dummy poles 32 that are adjacent in the axial direction is small. As a result, a leakage magnetic flux 50 that does not contribute to torque generation is generated in the axial direction, and an effective magnetic flux 51 that contributes to torque generation decreases.

As shown in FIG. 5, in the third comparative example, the magnet poles 31 and the dummy poles 32 are arranged and disposed in the axial direction. The pair of magnetic poles 30 that are adjacent in the axial direction or in the circumferential direction are disposed so as to mutually have differing polarities. The non-magnetic holes 40 are provided between the magnet poles 31 and dummy poles 32 that are adjacent in the axial direction. Due to the presence of the non-magnetic holes 40, magnetic resistance in the axial direction between the magnet poles 31 and the dummy poles 32 increases. As a result, the leakage magnetic flux 50 mentioned above decreases, and the effective magnetic flux 51 that contributes to the torque increases. However, in the rotor 20 of the third comparative example (FIG. 5), a dimension in the axial direction becomes larger compared to the rotor 20 of the second comparative example (FIG. 4), by the extent added by the non-magnetic holes 40. Therefore, the dimension of the rotating electrical machine in the axial direction becomes larger.

Figure 6A:
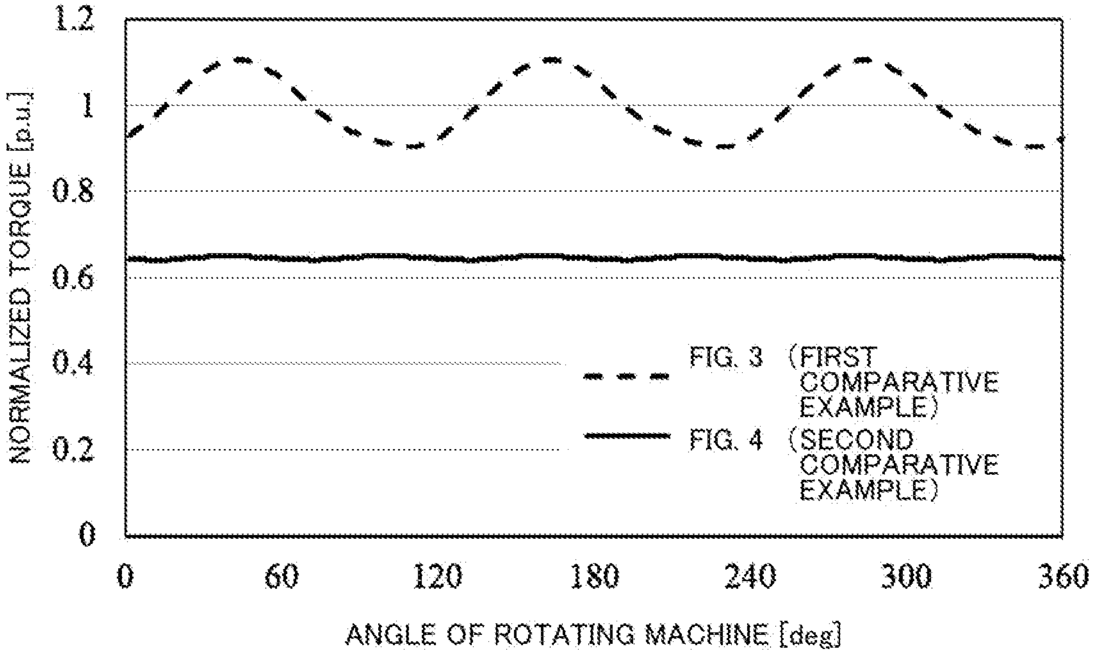
FIG. 6A is a graph showing a torque waveform of the rotating electrical machine according to the first comparative example and the second comparative example.

FIG. 6A is a graph that shows the obtainable torque waveform from the rotating electrical machine of the first comparative example (FIG. 3) that includes the rotor, and the obtainable torque waveform from the rotating electrical machine of the second comparative example (FIG. 4) that includes the rotor. The vertical axis of the graph in FIG. 6A shows a torque [p.u.] normalized with an obtainable average torque value from the rotating electrical machine of the first comparative example as the standard. As shown in FIG. 6A, the obtainable torque waveform from the rotating electrical machine according to the first comparative example includes three-dimensional pulsation. As opposed to this the obtainable torque waveform from the rotating electrical machine according to the second comparative example is able to decrease the three-dimensional pulsation.

However, if the average obtainable torque from the rotating electrical machine according to the first comparative example is set to 1, the average obtainable torque from the rotating electrical machine according to the second comparative example is 0.64. In other words, although the second comparative example is advantageous over the first comparative example in that the former is able to decrease the torque pulsation, the former is disadvantageous in that the size of the torque declines. As explained earlier, the magnet poles 31 and the dummy poles 32 being closely disposed to one another in the axial direction is a cause of the torque decrease in the second comparative example. In other words, the leakage magnetic flux 50 is generated between the magnet poles 31 and the dummy poles 32 that are adjacent in the axial direction, causing the effective magnetic flux 51 that contributes to torque generation to decrease.

Figure 6B:
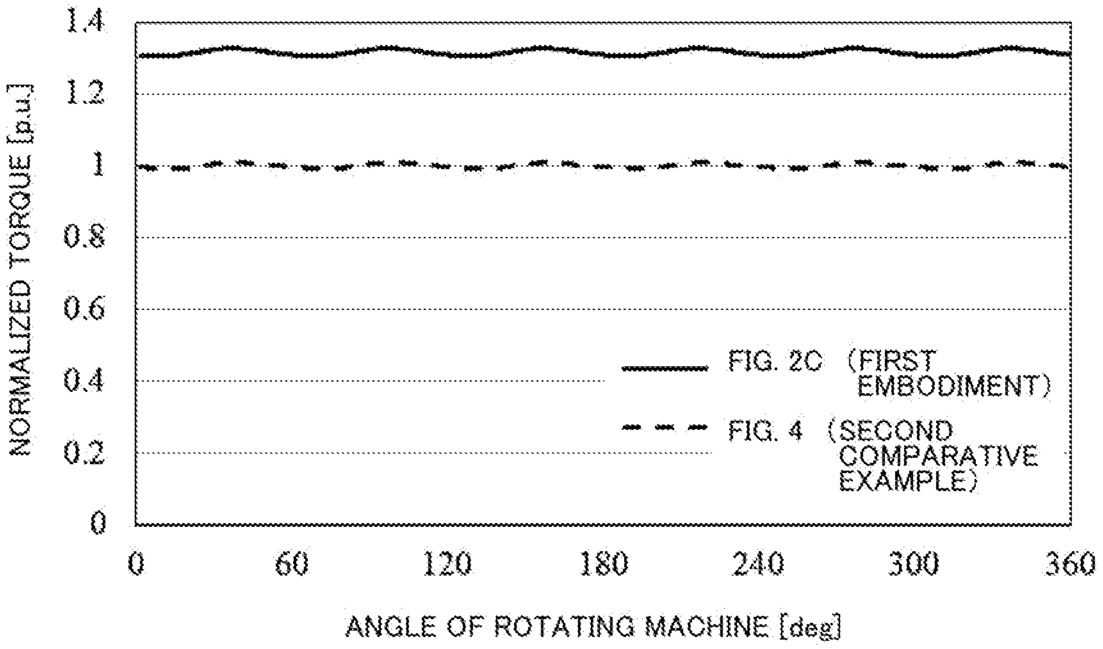
FIG. 6B is a graph showing the torque waveform of the rotating electrical machine according to the first embodiment and the second comparative example.

FIG. 6B is a graph showing the obtainable torque waveform from the rotating electrical machine of the second comparative example (FIG. 4) that includes the rotor, and the obtainable torque waveform from the rotating electrical machine of the first embodiment (FIG. 2C) that includes the rotor. The vertical axis in the graph of FIG. 6B shows the torque [p.u.] normalized with the obtainable average torque values from the rotating electrical machine of the second comparative example as the standard. As FIG. 6B shows, it is possible to confirm that the rotating electrical machine according to the first embodiment compared to the rotating electrical machine according to the second comparative example includes 1.32 times average torque. This is because the rotor 20 according to the rust embodiment includes the non-magnetic holes 40.

In other words in the first embodiment (FIG. 2C), by providing the non-magnetic holes 40 between the magnet poles 31 and the dummy poles 32 that are adjacent in the axial direction, the magnetic resistance in the axial direction increases. As a result, since the leakage magnetic flux 50 (refer to FIG. 4) in the axial direction is decreased, it is possible to increase the effective magnetic flux 51 that contributes to torque generation. It is also possible to confirm that the torque pulsation is decreased in the first embodiment when comparing the graph of the first comparative example shown in FIG. 6A, with the graph of the first embodiment shown in FIG. 6B.

Next, the first embodiment (FIG. 2C) and the third comparative example (FIG. 5) are compared. With respect to the third comparative example, the non-magnetic holes 40 are provided between the magnet poles 31 and the dummy poles 32 that are adjacent in the axial direction. For this reason, in the configuration of the third comparative example, along with improving the average torque, it is possible to decrease the torque pulsations. However, in the configuration of the first embodiment, when compared with the configuration of the third comparative example, it is possible to decrease a needed size of the rotor 20 to obtain a similar torque. The reasoning is explained below.

The size of the effective magnetic flux 51 (refer to FIG. 2A) that contributes to torque generation is dependent on the size of the magnet poles 31 (the amount of permanent magnets used). In other words, the larger the size of the magnet poles 31, the larger the size of the effective magnetic flux 51 becomes. As shown in the third comparative example in FIG. 5, when an axial direction length of the rotor core 21 is lc', an axial direction length of each magnet pole 31 is tm', an axial direction length of each dummy pole 32 is tc', and an axial direction length of each non-magnetic hole 40 is ta', since tm'=tc', the following equation (3) is satisfied:

$$lc'=tm'+ta'+tc'=(tm'\times 2)+ta' \quad (3)$$

Equation (4) below is obtained by taking the difference between the above equation (3) and the previously mentioned equation (1):

$$lc-lc'=(tm+ta+tc)-((tm'\times 2)+ta') \quad (4)$$

In the third comparative example (FIG. 5) and the first embodiment (FIG. 2B), when dimensions of the magnet poles 31 and the non-magnetic holes 40 in the axial direction are made to be similar, roughly the same torque performance is obtainable. Thus, when substituting ta'=ta and tm'=tm in equation (4) and simplifying, the below equation (5) is obtained:

$$lc-lc'=tc-tm \quad (5)$$

According to equation (2), since tc−tm<0, the value on the right hand side of equation (5) becomes a value smaller than zero. In other words, when roughly the same torque performance is to be obtained in the first embodiment and in the third comparative example, the dimension lc of the rotor core 21 in the first embodiment becomes smaller than the dimension lc' of the rotor core 21 in the third comparative example.

As mentioned above, when the configuration of the first embodiment is adopted, compared to the first comparative example, the torque pulsations are suppressed, compared to the second comparative example, the average torque is improved, and compared to the third comparative example, it is possible to make the size of the rotating electrical machine 100 in the axial direction smaller.

Figure 7:
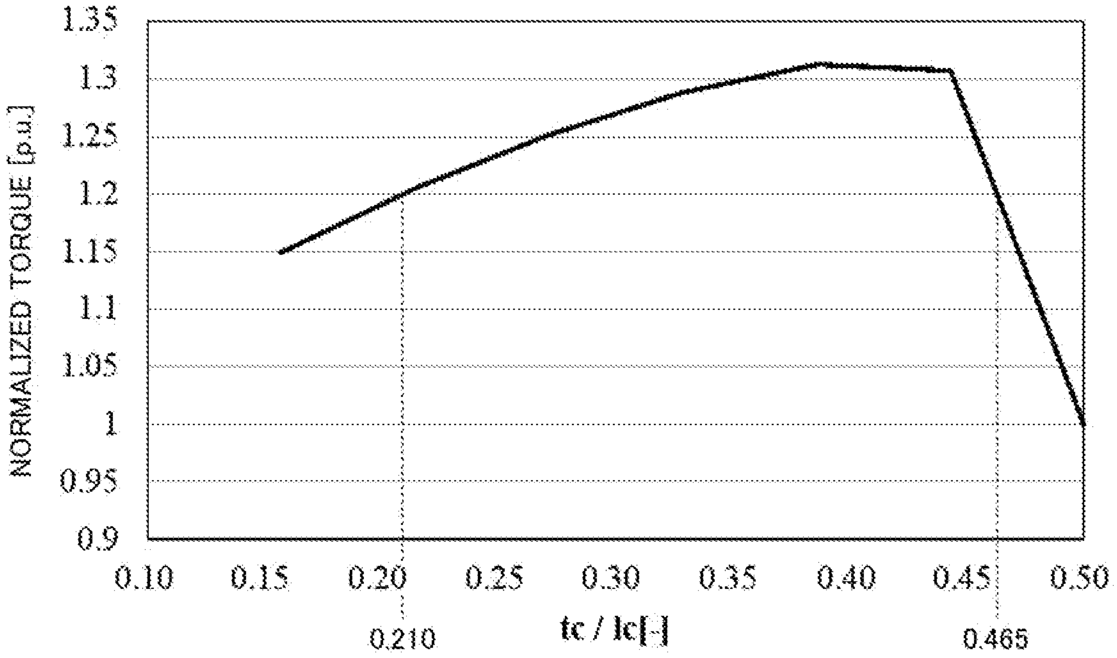
FIG. 7 is a graph showing effects an axial direction length of a dummy pole have on a size of the torque in the rotating electrical machine according to a first embodiment.

Next, a preferable range of sizes of the dummy poles 32 is explained using FIG. 7. The horizontal axis of FIG. 7 is the axial direction length tc of each dummy pole 32 divided by the axial direction length of the rotor core 21 lc, or tc/lc. The vertical axis of FIG. 7 shows the torque values normalized using the obtainable average torque from the rotating electrical machine that includes the rotor 20 (in other words, the configuration of FIG. 4) in which tc/lc=tm/lc=0.5. Further, in the experiment according to FIG. 7, the dimension of each magnet pole 31 in the axial direction tm is fixed at half the axial length lc of the rotor core 21 (in other words, tm=lc/2). Therefore, in the horizontal axis in FIG. 7, a case where tc/lc=0.5 means that ta=0 (in other words, a configuration where the non-magnetic holes 40 are not present). Also, the smaller the value of tc/lc becomes, the larger the value of ta becomes.

As shown in FIG. 7, when the horizontal axis is in the range of 0.210≤tc/lc≤0.465, the normalized torque is greater than or equal to 1.2. In other words, by making the value of tc/lc be in the above range, it is possible to obtain an average torque greater than or equal to 1.2 times, when compared with the configuration of FIG. 4. Also, as shown in FIG. 7, when the horizontal axis is in the range of 0.35<tc/lc<0.45, the normalized torque is roughly at the maximum.

From the above, satisfying 0.210≤tc/lc≤0.465 is preferable, and satisfying 0.35<tc/lc<0.45 is even more preferable.

As explained above, the rotating electrical machine 100 according to the present embodiment includes the stator 10, and the rotor 20 that is disposed inside the stator 10 so as to be in a rotatable state with respect to the stator 10. The stator 10 includes the core back 12 formed in an annular shape, the plurality of teeth 13 radially projecting from the core back 12 towards the rotor 20, and the plurality of windings 14 wounded around the plurality of teeth 13. The rotor 20 includes the rotor core 21, the shaft 23 disposed inside the rotor core 21 and extending in the axial direction, and the plurality of magnetic poles 30 disposed on the surface of the rotor core 21. The plurality of magnetic poles 30 includes the plurality of magnet poles 31 formed by permanent magnets, and the plurality of dummy poles 32 formed by the magnetic flux 50 emitted from the magnet poles 31 interlinking with parts of the rotor core 21. The magnet poles 31 and the dummy poles 32 are alternately disposed in both the axial direction and the circumferential direction. The non-magnetic holes 40 are provided between the magnet poles 31 and the dummy poles 32 that are adjacent in the axial direction. When a length of each magnet pole 31 of the magnet poles 31 in the axial direction is tm, a length of each dummy pole 32 of the dummy poles 32 in the axial direction is tc, a length of each non-magnetic hole 40 of the non-magnetic holes 40 in the axial direction is ta, and a length of the rotor core 21 in the axial direction is lc, tm>tc and lc<(2×tm)+ta is satisfied. From this configuration while suppressing the torque pulsations, the average torque is improved, and it possible to make the size of the rotating electrical machine 100 in the axial direction smaller.

In the case where the relation 0.210≤tc/lc≤0.465 is satisfied, compared to a configuration where the non-magnetic holes 40 are not provided (FIG. 4), it is possible to obtain an average torque equal to 1.2 times.

Second Embodiment

Figure 8:
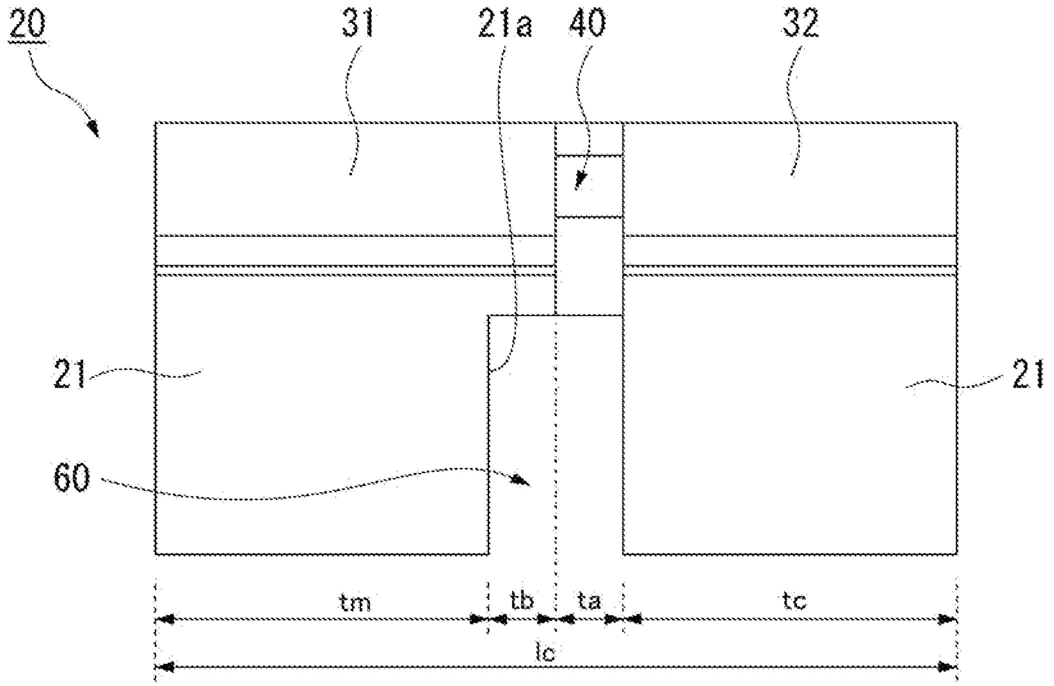
FIG. 8 is a side view of the quarter model of a rotor 20 of the rotating electrical machine according to the second embodiment.

FIG. 8 is a side view showing the quarter model of the rotor 20 according to a second embodiment. Although not shown, the stator 10 is provided (refer to FIG. 1 and FIG. 2) on an outer circumferential side of the rotor 20, through the gaps 15. Components having similar functions and effects to those of the first embodiment have been denoted with the same reference symbols, and explanations have been simplified.

As shown in FIG. 8, in the second embodiment, non-magnetic regions 60 are provided on the radially inner side of a magnet pole 31 of the magnet poles 31. Specifically, a notch 21*a* is formed on a part of the rotor core 21 located on the radially inner side of a magnet pole 31 of the magnet poles 31. An opening on the inside of the notch 21*a* is a non-magnetic region 60 of the non-magnetic regions 60. In FIG. 8, although the view of the shaft 23 is simplified, a non-magnetic region 60 of the non-magnetic regions 60 is located between the magnet pole 31 and the shaft 23 in the radial direction.

As with the non-magnetic holes 40, the plurality of non-magnetic regions 60 are parts that do not have any magnetic bodies disposed therein. For example, in a non-magnetic region 60 of the non-magnetic regions 60, air may be present, or a non-magnetic body may be present. The non-magnetic regions 60 and the non-magnetic holes 40 are adjacent and are connected in the axial direction. The non-magnetic regions 60 may also be present on the radially inner side of a dummy pole 32 of the dummy poles 32.

Figure 9:
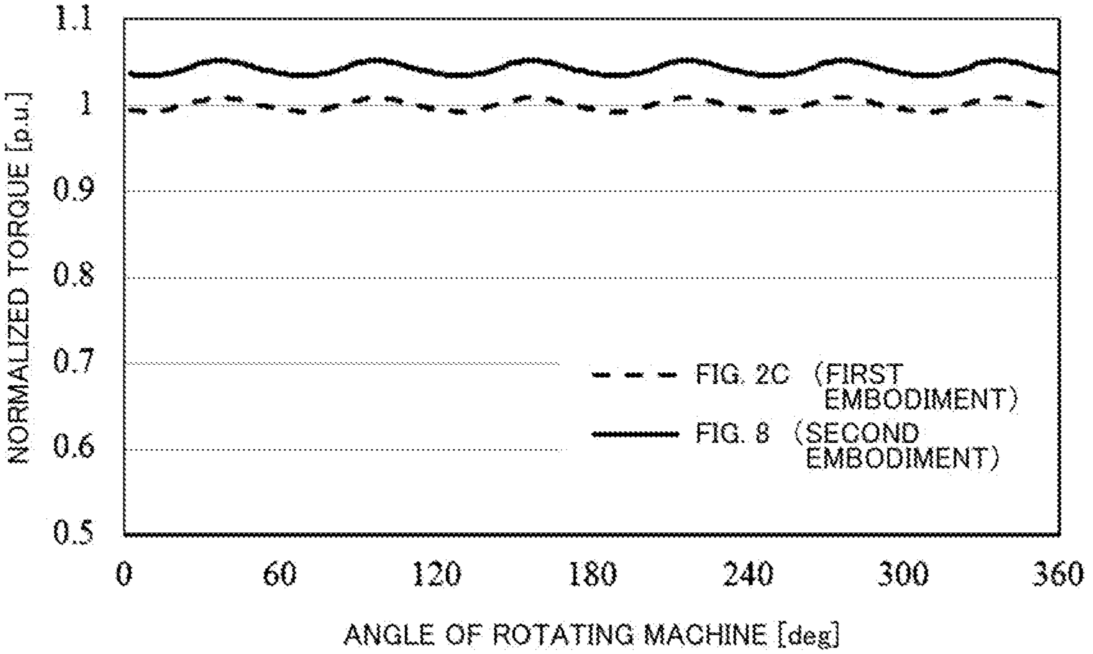
FIG. 9 is a graph showing the torque wave form of the rotating electrical machine according to the first embodiment and the second embodiment.

FIG. 9 is a graph that shows the obtainable torque waveform from the rotating electrical machine according to the first embodiment (FIG. 2C) and the obtainable torque waveform from the rotating electrical machine according to the second embodiment (FIG. 8). The vertical axis of the graph shows a torque [p.u.] normalized with an obtainable average torque value from the rotating electrical machine of the first embodiment as the standard.

As shown in FIG. 9 the average torque that is obtainable from the rotating electrical machine according to the second embodiment is about 1.04 times compared to the first embodiment. The reason is that, compared to the first embodiment, the magnetic resistance in the axial direction further increases in the second embodiment due to the presence of a non-magnetic region 60 of the non-magnetic regions 60. In other words, in the second embodiment, due to further increase of the magnetic resistance, the leakage magnetic flux 50 (refer to FIG. 4) in the axial direction decreases, and the effective magnetic flux 51 increases, making it possible for the average torque to rise.

Figure 10:
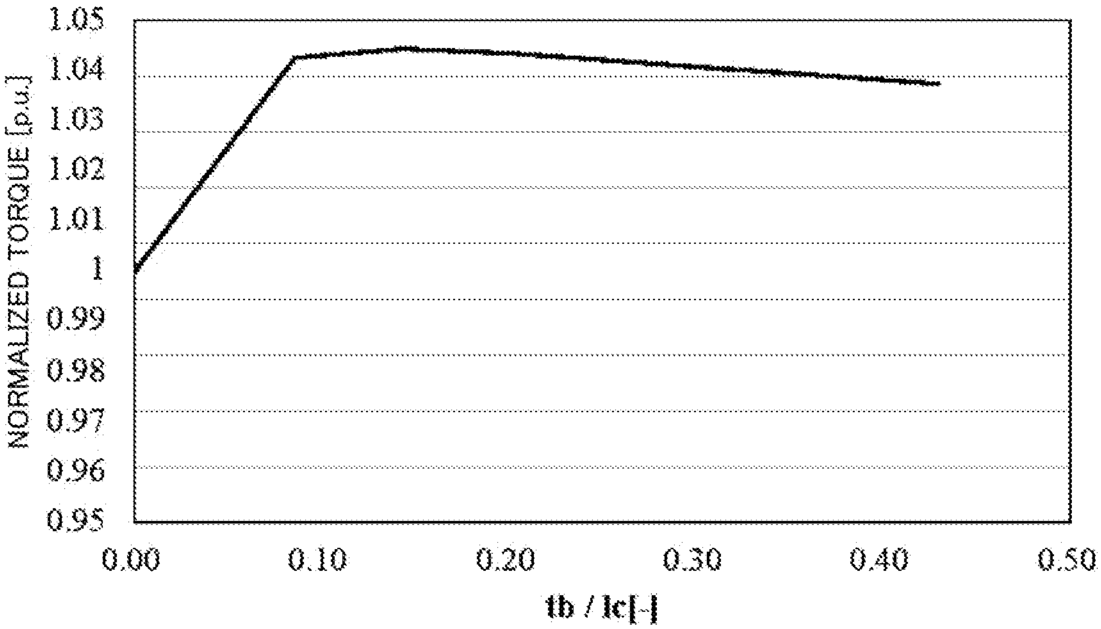
FIG. 10 is a graph showing the effects an axial direction length of a non-magnetic region have on the size of the torque in the rotating electrical machine according to the second embodiment.

FIG. 10 shows the dependency of the obtainable average torque from the rotating electrical machine according to the second embodiment (FIG. 8) with respect to the axial direction length tb of each non-magnetic region 60. The horizontal axis of FIG. 10 is the value of the axial direction length tb of each non-magnetic region 60 divided by the axial direction length lc of the rotor core 21, tb/lc. The vertical axis of FIG. 10 shows the torque value normalized with the obtainable average torque as the standard in the rotating electrical machine according to the first embodiment (FIG. 2B) in the case where tm/lc=0.5. As shown in FIG. 10, it is possible to confirm that the average torque is at a maximum in the vicinity of tb/lc=0.15.

Figure 11:
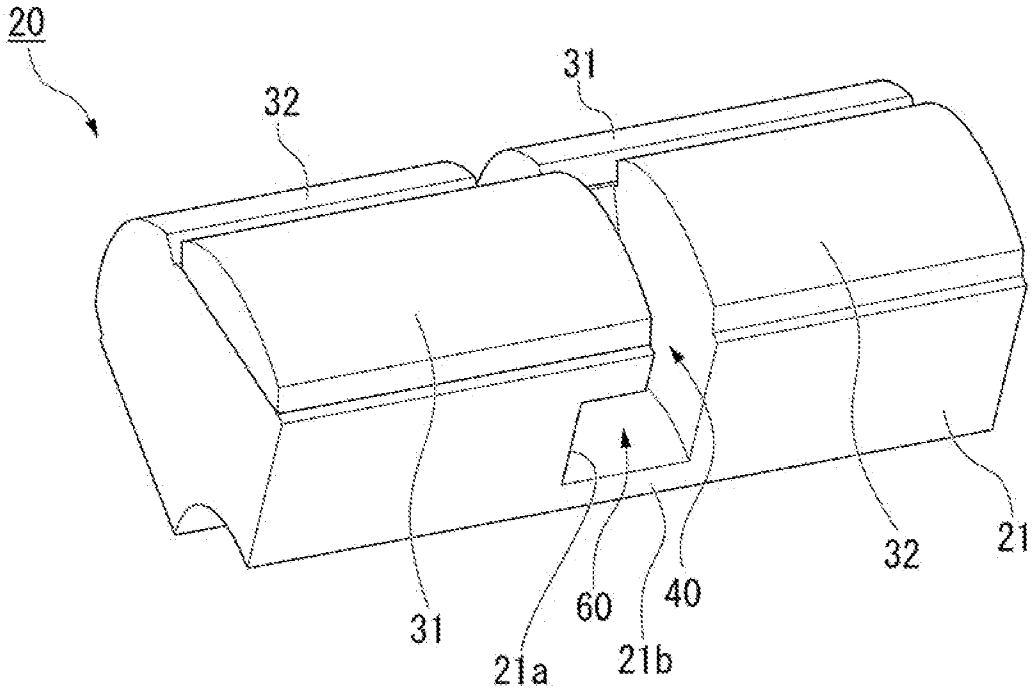
FIG. 11 is a perspective view showing the quarter model of the rotor according to a modified example of the second embodiment.

FIG. 11 is a side view showing the quarter model of the rotor 20 according to a modified example of the second embodiment. In the modified example, as shown in FIG. 11, a connecting portion **21*b* is provided on a radially inner side of the notch 21*a* (a non-magnetic region 60 of the non-magnetic regions 60). The connecting portion 21*b* is apart of the rotor core 21. In the rotor core 21, the portion located on the radially inner side of a magnet pole 31 of the magnet poles 31, and the portion located on the radially inner side of a dummy pole 32 of the dummy poles 32 are connected by the connecting portion 21*b*. In other words, the magnet poles 31 and the dummy poles 32 are provided on top of the surface of the connected rotor core 21. By adopting such a configuration, the positional relationship in the axial direction between the magnet poles 31 and the dummy poles 32** is stabilized.

As explained above, in the rotating electrical machine 100 according to the second embodiment, the non-magnetic regions 60 is provided between the shaft 23 and the magnet poles 31. Due to the presence of the non-magnetic regions 60, the magnetic resistance between the magnet poles 31 and the dummy poles 32 in the axial direction is further increased, making it possible to obtain a larger average torque.

In the rotor 20 according to the modified example (FIG. 11) of the second embodiment, the rotor core 21 includes the connecting portion **21*b*. In the rotor core 21, the connecting portion 21*b* connects a portion located on the radially inner side of a magnet pole 31 of the magnet poles 31 to a portion located on the radially inner side of a dummy pole 32 of the dummy poles 32. According to such a configuration, the positional relationship in the axial direction of the magnet poles 31 and the dummy poles 32** is stabilized, and it is possible to decrease torque variabilities or the like that accompany manufacturing errors.

Third Embodiment

Figure 12:
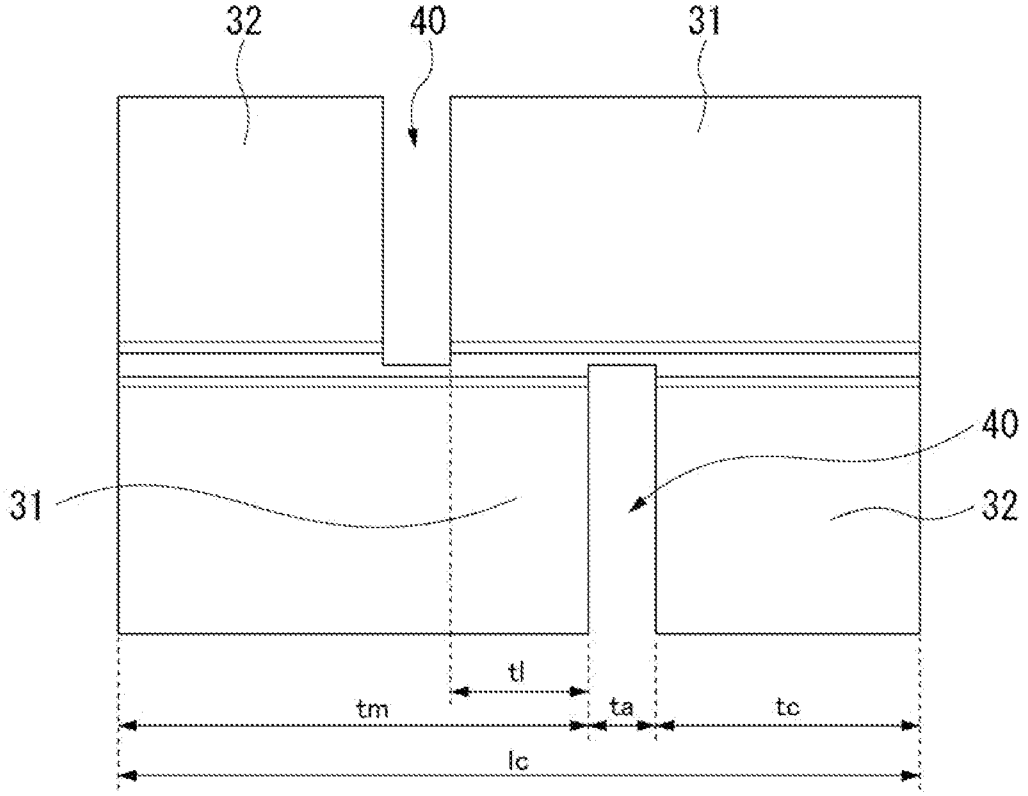
FIG. 12 is a side view showing the quarter model of the rotor according to the third embodiment.

FIG. 12 is a side view showing the quarter model of the rotor 20 according to the third embodiment. Although not shown, the stator 10 is provided through the gaps 15 (refer to FIG. 1, FIG. 2) on the outer circumferential side of the rotor 20. Components having similar functions and effects to those of the first embodiment have been denoted with the same reference symbols, and explanations have been simplified.

As shown in FIG. 12, in the third embodiment two magnet poles 31 that are adjacent in the circumferential direction are disposed so as to have an overlapping part in the axial direction. When focusing on one of the magnet poles 31, the magnet pole 31 contacts the dummy pole 32, the non-magnetic hole 40, and each of the other magnet poles 31 in the circumferential direction. In other words, according to the third embodiment the rotor 20 includes a layer in which the magnet poles 31 and the dummy poles 32 are disposed alternately in the circumferential direction (a region in the axial direction), and a layer in which the magnet poles 31 are arranged in the circumferential direction without the dummy poles 32 being disposed. When the axial direction length of the rotor core 21 is lc, the axial direction length of each magnet pole 31 is tm, the axial direction length of each dummy pole 32 is tc, and the axial direction length of each non-magnetic hole 40 is ta, $tc<tm$ and $lc<(2\times tm)+ta$ are satisfied. The axial direction length of each overlapping part mentioned above is tl. By adjusting tl, it is possible to adjust the amount of the permanent magnets used.

Figure 13:
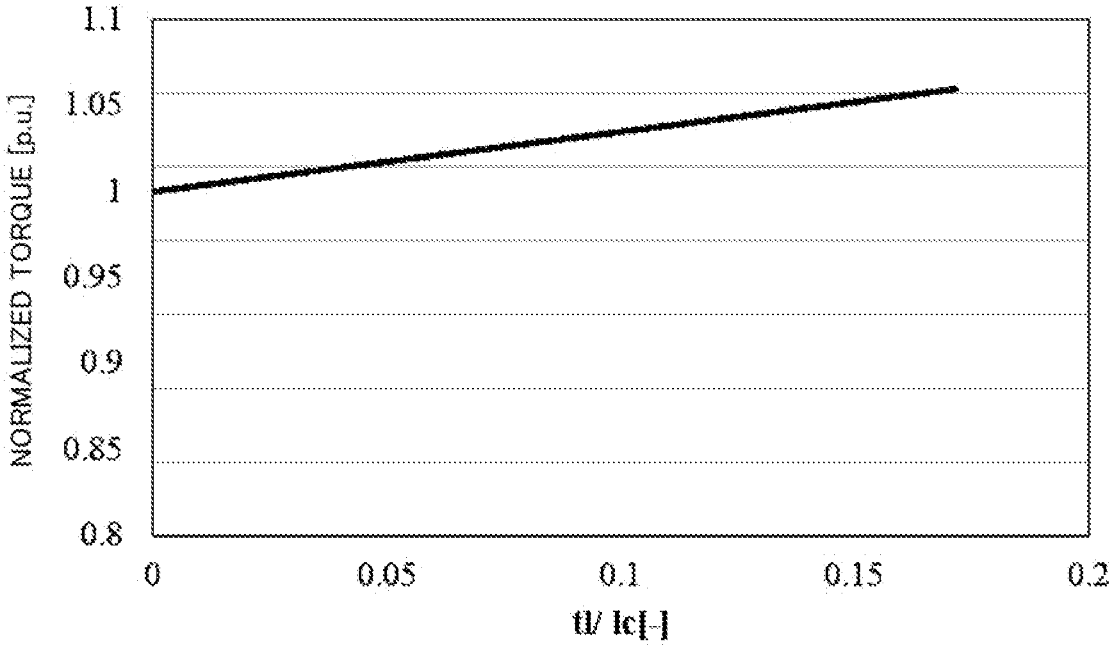
FIG. 13 is a graph showing the effects an axial direction length of overlapping portions in a pair of magnet poles have on the size of torque in the rotating electrical machine according to the third embodiment.

FIG. 13 is a graph that shows the obtainable average torque of the rotating electrical machine according to the third embodiment (FIG. 12). The horizontal axis of FIG. 13 tl is a value normalized with the axial length lc of the rotor core 21. The vertical axis of FIG. 13 shows the torque [p.u.] normalized with the average torque values of the rotating electrical machine according to the first embodiment (FIG. 2C) as the standard. As shown in FIG. 13, it is possible to confirm that increasing tl increases the average torque. This is because the larger tl is, the more the volume of the magnet poles 31 (the amount of permanent magnets used) increases, causing the effective magnetic flux 51 (refer to FIG. 2A) to increase, and the average torque to improve.

As explained above, the rotor 20 according to the third embodiment includes a layer in which the magnet poles 31 and the dummy poles 32 are disposed alternately in the circumferential direction, and a layer in which the magnet poles 31 are arranged in the circumferential direction without the dummy poles 32 being disposed. From this, while suppressing the axial length lc of the rotor core 21, the volume of the magnet poles 31 (the amount of permanent magnets used) is increased, and it is possible to obtain a larger average torque.

In addition, the various embodiments may be freely combined, and it is possible to appropriately modify, omit, or simplify the various embodiments.

As shown in FIG. 2A in the rotor 20 two of the magnetic poles 30 (the magnet poles 31 and the dummy poles 32) are aligned in the axial direction. However, the rotor 20 with three or more of the magnetic poles 30 are arranged in the axial direction may be adopted.

Also, 0.210≤tc/lc≤0.465 may be satisfied in a configuration other than that of the first embodiment.

Also, the rotor core 21 according to other embodiments may include the connecting portion 21*b* shown in FIG. 11.

REFERENCE SYMBOL EXPLANATION

10 . . . Stator, 12 . . . Core Back, 13 . . . Teeth, 14 . . . Windings, 20 . . . Rotor, 21 . . . Rotor Core, 21*b* . . . Connecting portion, 23 . . . Shaft, 30 . . . Magnetic Pole, 31 . . . Magnet Pole, 32 . . . Dummy Pole, 40 . . . Non-Magnetic Hole, 60 . . . Non-Magnetic Region, 100 . . . Rotating electrical machine

The invention claimed is:

1. A rotating electrical machine comprising:

a stator; and a rotor disposed inside the stator in a rotatable state with respect to the stator; wherein the stator includes a core back formed in an annular shape, a plurality of teeth radially projecting from the core back towards the rotor, and a plurality of windings wounded around the plurality of teeth, the rotor includes a rotor core, a shaft disposed inside the rotor core and extending in an axial direction, and a plurality of magnetic poles disposed on a surface of the rotor core, the plurality of magnetic poles includes a plurality of magnet poles formed by permanent magnets, and a plurality of dummy poles formed by magnetic flux emitted from the magnet poles interlinking with parts of the rotor core, the magnet poles and the dummy poles are alternately disposed in both the axial direction and a circumferential direction, the dummy poles are disposed to be next to no magnet poles in a radial direction, non-magnetic holes are provided between the magnet poles and the dummy poles that are adjacent in the axial direction to provide a space such that the magnet poles and the dummy poles do not abut in the axial direction, when a length of each magnet pole of the magnet poles in the axial direction is tm, a length of each dummy pole of the dummy poles in the axial direction is tc, a length of each non-magnetic hole of the non-magnetic holes in the axial direction is ta, and a length of the rotor core in the axial direction is lc, the rotating electrical machine satisfies tm>tc and lc<(2×tm)+ta, a notch is formed on the rotor core, and an opening on the inside of the notch is a non-magnetic region.

2. The rotating electrical machine according to claim 1, wherein the non-magnetic region is provided between the shaft and a magnet pole of the magnet poles.

3. The rotating electrical machine according to claim 1, wherein the rotor includes a layer in which the magnet poles and the dummy poles are disposed alternately in the circumferential direction, and a layer in which the magnet poles are arranged in the circumferential direction without the dummy poles being disposed.

4. The rotating electrical machine according to claim 1, wherein the rotor core includes a connecting portion, the connecting portion connects a portion of the rotor core located on a radially inner side of a magnet pole of the magnet poles, and a portion of the rotor core located on a radially inner side of a dummy pole of the dummy poles.

5. The rotating electrical machine according to claim 1, wherein the rotating electrical machine satisfies 0.210≤tc/lc≤0.465.

6. The rotating electrical machine according to claim 2, wherein the rotor includes a layer in which the magnet poles and the dummy poles are disposed alternately in the circumferential direction, and a layer in which the magnet poles are arranged in the circumferential direction without the dummy poles being disposed.

7. The rotating electrical machine according to claim 2, wherein the rotor core includes a connecting portion, the connecting portion connects a portion of the rotor core located on a radially inner side of a magnet pole of the magnet poles, and a portion of the rotor core located on a radially inner side of a dummy pole of the dummy poles.

8. The rotating electrical machine according to claim 3, wherein the rotor core includes a connecting portion, the connecting portion connects a portion of the rotor core located on a radially inner side of a magnet pole of the magnet poles, and a portion of the rotor core located on a radially inner side of a dummy pole of the dummy poles.

9. The rotating electrical machine according to claim 6, wherein the rotor core includes a connecting portion, the connecting portion connects a portion of the rotor core located on a radially inner side of a magnet pole of the magnet poles, and a portion of the rotor core located on a radially inner side of a dummy pole of the dummy poles.

10. The rotating electrical machine according to claim 2, wherein the rotating electrical machine satisfies 0.210≤tc/lc≤0.465.

11. The rotating electrical machine according to claim 3, wherein the rotating electrical machine satisfies 0.210≤tc/lc≤0.465.

12. The rotating electrical machine according to claim 4, wherein the rotating electrical machine satisfies 0.210≤tc/lc≤0.465.

13. The rotating electrical machine according to claim 6, wherein the rotating electrical machine satisfies 0.210≤tc/lc≤0.465.

14. The rotating electrical machine according to claim 7, wherein the rotating electrical machine satisfies $0.210 \leq tc/lc \leq 0.465$.

15. The rotating electrical machine according to claim 8, wherein the rotating electrical machine satisfies $0.210 \leq tc/lc \leq 0.465$.

16. The rotating electrical machine according to claim 9, wherein the rotating electrical machine satisfies $0.210 \leq tc/lc \leq 0.465$.

17. The rotating electrical machine according to claim 1, wherein a non-magnetic region is provided between the shaft and a magnet pole of the magnet poles, and the non-magnetic region and the non-magnetic hole are adjacent.

* * * * *